A. F. RIETZEL.
METHOD OF JOINING METAL BY WELDED RIVETS.
APPLICATION FILED JULY 14, 1914.

1,154,808.

Patented Sept. 28, 1915.

WITNESSES:
H. B. Townsend
Henry A. Gens

INVENTOR.
Adolph F. Rietzel
BY
Townsend & Decker
ATTORNEYS

UNITED STATES PATENT OFFICE.

ADOLPH F. RIETZEL, OF CHARLESTOWN, RHODE ISLAND, ASSIGNOR TO UNIVERSAL ELECTRIC WELDING COMPANY, OF NEW YORK, N. Y., A CORPORATION OF NEW YORK.

METHOD OF JOINING METAL BY WELDED RIVETS.

1,154,808. Specification of Letters Patent. Patented Sept. 28, 1915.

Original application filed September 16, 1909, Serial No. 517,972. Divided and application filed June 14, 1913, Serial No. 773,586. Divided and this application filed July 14, 1914. Serial No. 850,842.

*To all whom it may concern:*

Be it known that I, ADOLPH F. RIETZEL, a citizen of the United States, and a resident of Charlestown, in the county of Washington and State of Rhode Island, have invented certain new and useful Improvements in Methods of Joining Metal by Welded Rivets, of which the following is a specification.

My invention relates to an improved method of uniting two pieces of metal together by the welding of a metal blank to said pieces and consists essentially in preparing the pieces with holes in their meeting faces, inserting a blank between the pieces adapted to enter said holes and then heating and pressing the pieces together to weld the blank in the holes.

My invention consists also in metal work having its elements united by a welding piece welded in holes in the meeting faces of the elements.

Figure 1:
Figure 2:
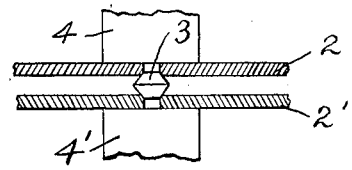
Figure 3:
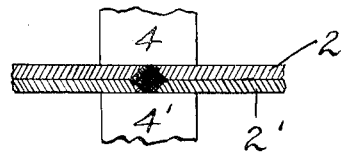

In the accompanying drawings Figure 1 is a side elevation of a blank adapted for use in practising my invention. Fig. 2 shows said blank assembled in position between the pieces to be united after the latter have been provided with holes in their meeting faces adapted to receive the ends of said blank and with the pieces in position between the electrodes of an electric welding machine. Fig. 3 shows roughly the completion of the operation and the completed work.

In the drawing the blank itself, shown in Fig. 1, is conveniently constructed with tapered or reduced ends, the taper extending preferably clear around the blank and adapting it to partially enter holes in the pieces to be united, said holes being preferably of a gage less than the maximum diameter of the blank or that taken on its medial line. The two plates or pieces to be united are indicated by the numerals 2, 2', while 4, 4' represent respectively the electrodes of a welding machine by which electrical heating current and pressure may be applied to the blank and pieces. The said pieces themselves are initially provided with holes in their meeting faces preferably by perforating said pieces. When the holes are of somewhat less diameter than the diameter of the blank, the said tapered or reduced portion of the blank welding piece, when arranged between the meeting faces of the pieces and in said holes, will engage the edges of the hole or cavity in each piece as shown. The extent and form of the hole and of the taper or reduction of the end of the blank may be varied as desired and may be such, as shown, that the extremity of the blank will stop short of the bottom of the hole which, in the case of preparing the pieces by perforation, would be the outer surface of said pieces. In this case the effect is to leave a considerable void space in the hole after the blank has been entered therein, which, however, will become filled by the material of the blank itself, when the latter is of sufficient mass, through the application of the heating electric current and pressure. After assembling the blank and pieces in the relation shown in Fig. 2, the application of the heating electric current and pressure will cause the blank to be united to both pieces and a finished product somewhat as shown in Fig. 3 will result, in which the uniting piece will be massed or located entirely below the level of the outer surface of said pieces, the void space shown in Fig. 2 being entirely filled, if desired, with the metal of the blank. Hence, as will be seen, the union of any two pieces of metal can be effected by my invention in such manner that no projection above the outer surface of either piece will be left and the two pieces will be firmly united by an electrical welding of a blank, which in its function and method of application in a manner resembles an ordinary rivet but which is different from an ordinary rivet in being firmly united or welded to both of the pieces to be joined.

Obviously, in practising my invention, the extent to which the tapered or reduced end of the blank shall enter the hole and the angle on the taper are matters of choice and may be varied without departing from the invention. It is likewise obvious that the form of the hole which receives the blank may be varied without departing from the invention, said hole serving merely to locate the blank and to form a cavity to receive the blank and in which said blank may be welded and united to said pieces.

My present application is a division of my application filed June 14th 1913, Serial No. 773,586, in which I have claimed the welding blank used in the foregoing operation, said application having been filed as a division of my original application filed September 16th 1909, Serial No. 517,972, resulting as to a part thereof in Patent No. 1,082,767, dated December 30th 1913.

What I claim as my invention is:—

1. The method of welding two pieces of metal together, consisting in inserting a welding blank between the pieces and in holes in the meeting portions of said pieces and pressing the two pieces together while the blank is heated to welding temperature.

2. The method of electrically welding two pieces of metal together, consisting in inserting a welding blank between the pieces and in holes in the meeting portions of said pieces and pressing the two pieces together while the blank is heated to welding temperature in an electric current.

3. The method of uniting two pieces of metal, consisting in perforating both of them, inserting a welding blank between the pieces in the holes therein and of a form to partially only enter said holes and then pressing the pieces together while the blank is heated to welding temperature.

4. Composite metal work having its elements united by a welding piece located between the elements and welded in holes in the meeting portions of said elements.

Signed at Westerly in the county of Washington and State of Rhode Island this 11th day of July A. D. 1914.

ADOLPH F. RIETZEL.

Witnesses:
CLARENCE E. ROCHE,
MICHAEL J. TURANO.